United States Patent Office 3,206,631
Patented Sept. 14, 1965

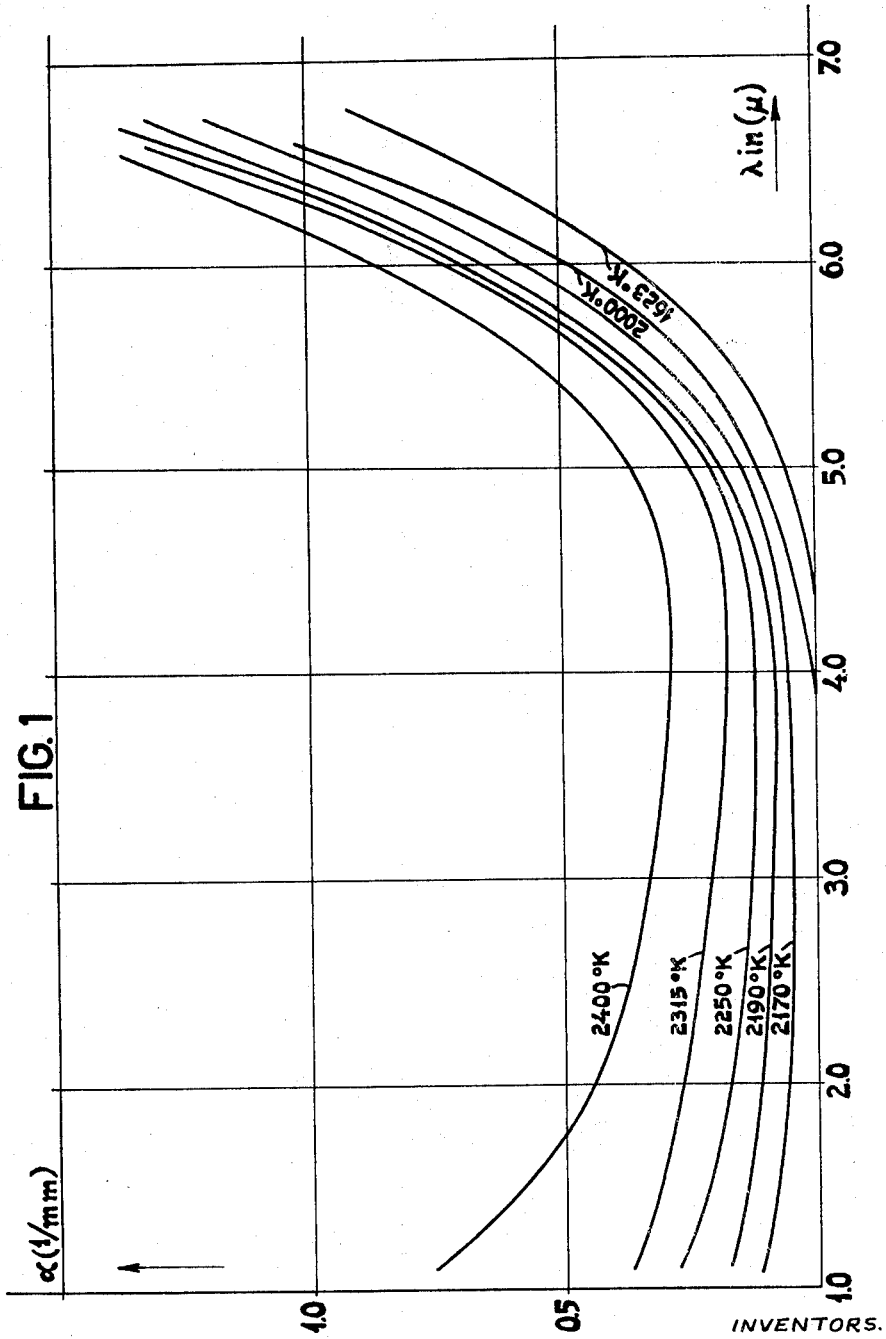

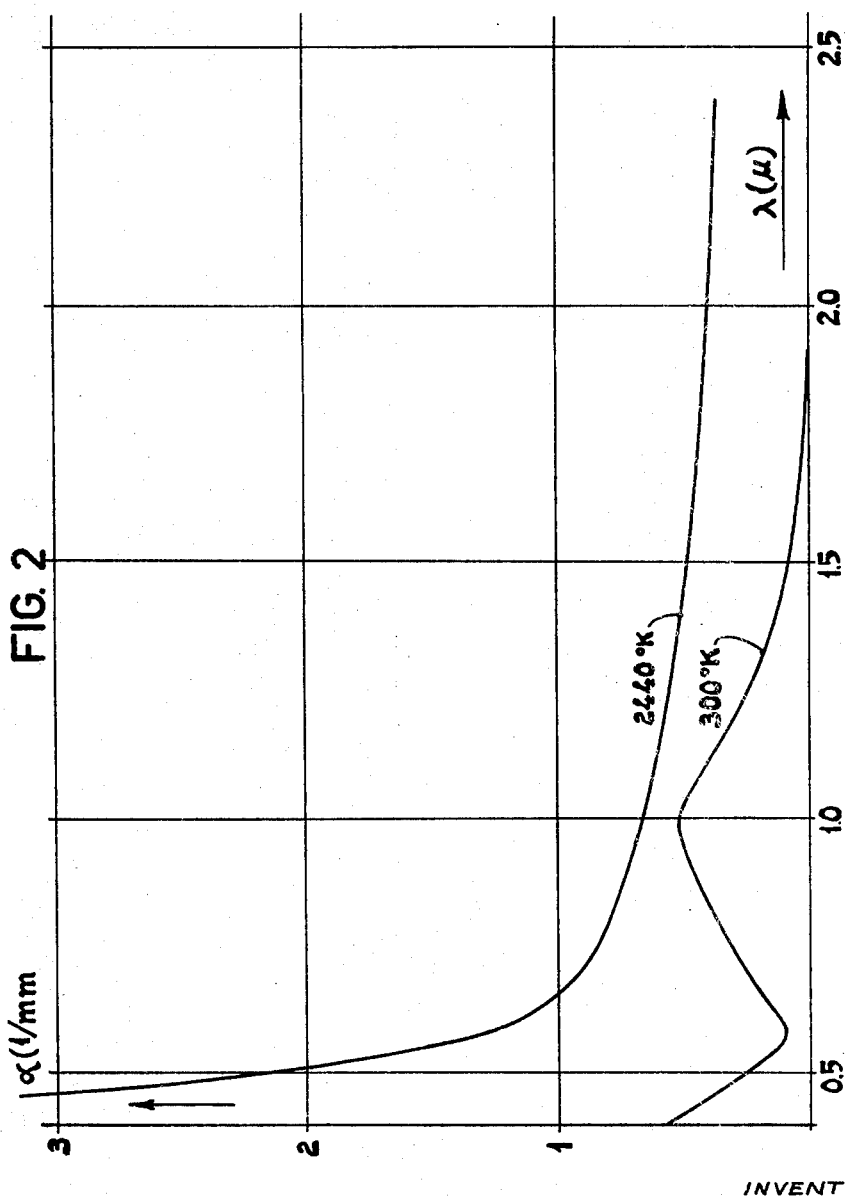

3,206,631
INCANDESCENT RADIATOR
Erhard Kauer, Rolf Groth, and Horst Hörster, Aachen, Germany, assignors to North American Philips Company, Inc., New York, N.Y., a corporation of Delaware
Filed Jan. 10, 1961, Ser. No. 81,726
Claims priority, application Germany, Jan. 30, 1960, N 17,820
13 Claims. (Cl. 313—14)

It has frequently been proposed to improve the light efficiency of thermal radiators by using incandescent members having selective radiation properties. Such an incandescent member is required to have a luminous emissivity which is approximately 1, but for all the other wave lengths, in particular in the near infrared, should be extremely small. However, in the case of non-metallic substances, that is to say insulators or semi-conductors, such requirements are only approximately realizable, and even then require a series impedance.

The present invention relates to a selective radiator having an incandescent member consisting of a single crystalline, coarse crystalline or glassy material, which member can be directly heated electrically.

According to the invention, the thickness $d$ expressed in millimetres of the incandescent member in at least one dimension meets the condition $$d \leq \frac{10^{-24} \cdot T^7}{\alpha_{\min.}}$$

and is preferably smaller than half this value, if $\alpha_{\min.}$ is the minimum value expressed in 1/mm. of its absorption coefficient in the near infrared between the wavelengths 0.7 and 5 microns ($\mu$) at an operating temperature T between approximately 2000 and 2800° K.

All considerations so far to realize the selective radiator are based on the point of view that the near infrared which in a large number of substances is substantially absorption-free at room temperature, remains absorption-free also at the desired operating temperature. However, as our investigations into MgO,ThO$_2$ and ZrO$_2$/CaO (stabilized) have proved, this condition has by no means been met insofar as operating temperatures of the incandescent member of approximately 2000° K. or higher are considered.

FIG. 1 is a graph showing the absorption coefficient of an undoped MgO crystal as a function of wave-length;

FIG. 2 is a graph showing the absorption coefficient of a doped MgO crystal as a function of wave-length;

FIG. 1 shows the variation of the absorption coefficient, expressed in 1/mm., of an undoped MgO-crystal in accordance with the wave length expressed in microns ($\mu$) at high temperatures, the range between 1 and 5$\mu$ being of particular importance, which at room temperature, is absorption-free and in which the greater part of the energy of a black body is radiated from 2000° K. to 3000° K. This constant absorption in the near infrared may have various causes, such, for example, as absorption of free charge carriers, transition of carriers between the sub-bands of a valency or conductivity band, transitions between discontinuities and the bands, etc. The existence of this infrared absorption occurring only at high temperature explains the earlier failures in realizing the selective radiators. It also proves that a so-called "grain limit radiation," as one often thought to have been found in the investigations into polycrystalline materials, does not exist. Our investigations have proved that it is not only sufficient to dope (to introduce color centers) the face material of a selective radiator suitably, so as to bring its luminous emissivity near 1, but that, in view of the unexpected infrared absorption, the thickness of the radiator should meet definite requirements. If the thickness is chosen too large, an incandescent member having the conditions of a selective radiator will behave as a nearly black radiator. It is therefore not sufficient to know the emission capacity of a selective radiating incandescent member; for an optimum explanation, one rather needs the knowledge of the absorption variation in the infrared as a function of the temperature.

When comparing thermal radiators mutually, the luminous efficiency of the black radiator may be used as a starting point which, at 2700° K., is approximately 12 lm/W (this corresponds approximately to the tungsten incandescent lamps). A selective radiator which is to have any practical importance, should meet this value. The determination of the thickness according to the invention meets this starting point.

For a selective radiator of which the base material consists of crystalline, in particular monocrystalline, MgO, it follows while observing the values of the absorption coefficient shown in FIG. 1, that the thickness should meet the condition.

$$d \leq 10^{17} \cdot T^{-5}$$

and is preferably smaller than half this value.

Figure 4:
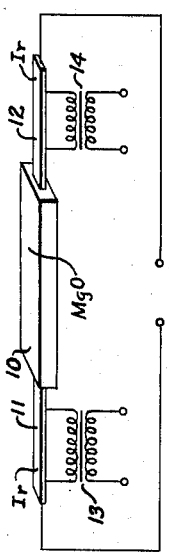
FIG. 4 shows one embodiment of the invention.

Referring to FIG. 4, in a first embodiment, an MgO crystal plate 10, 8 x 3 x 0.3 mm., which meets the above determination of the thickness, was suspended between two cold metal electrodes 11 and 12. A stable operating condition could not be reached, since the heat dissipation via the electrodes resulted in a cooling of the zones of the crystal lying in the proximity of the contact and consequently in a considerable increase of the resistance. The problem of bringing the contacts to approximately the same temperature as the crystal was solved by using iridium which may also be used in an oxygen atmosphere up to temperatures of approximately 2600° K. In this case, the Ir-electrodes which were tape-shaped, were heated from separate transformers 13 and 14. Since the heated electrodes result in ionisation of the ambient gas, the danger of breakdown exists at high operating voltages. This can be avoided, however, if, by suitable dimensioning of the heated current supply contact, provision is made that only the part of the contact immediately engaging the crystal reaches a high temperature (approximately the operating temperature of the crystal).

Heating of the Ir-electrodes may be omitted if the thickness of the tape is made so small that the heat dissipation via the contact does not cause actual cooling of the crystal zones lying in the proximity of the contact. In case difficulties should be encountered when starting operation, heat may be supplied externally to the incandescent member in known manner, for example in the form of a gas discharge.

The already stated absorption measurements of MgO-crystals have proved that the absorption in the near infrared occurring at high temperatures may be decreased by certain additions and by modifying the partial pressure of oxygen. Trivalent metals which can replace Mg, such for example as Al and Cr, appear to be particularly suitable for decreasing the absorption. Halides have a similar effect when they replace oxygen ions.

The effect of these additions is that they shift the equilibrium into the direction of the n-conductivity, which equilibrium in the case of undoped material lies on the side of the p-conductivity. A high concentration of holes increases the absorption in the near infrared probably owing to intermediate band transitions of the holes. It was established that by the addition of approximately 0.5 atomic percent of Al, Cr and F, the absorption in the near infrared may be approximately halved. Such an effect may also be expected from other additions which are stable in their valency. Decreasing the partial pressure of oxygen also effects a decrease of the p-concentration and consequently of the infrared absorption owing to the formation of oxygen deficiencies. However, with an arbitrary decrease of the partial pressure of oxygen limits are imposed for MgO decomposes rapidly at high temperatures if the oxygen pressure is smaller than $10^{-3}$ mms.; therefore, continuous operation of the radiator is not possible under these circumstances.

Since the absorption capacity of the undoped MgO in the visible spectrum range is too small also at high temperatures to obtain a high emission and consequently a high luminous efficiency, the base material should be doped so that at least at operating temperatures a sufficiently large absorption exists in the visible range. As coloring additions for MgO turn out to be suitable in this respect, Fe, Cr and Li. In the case of iron, a favorable effect is a priori not to be expected, it being incorporated in the bivalent state in the crystal lattice at low temperatures and in this form showing a significant disadvantageous absorption variation (see FIG. 2). If the absorption band at $1\mu$, which is based on transitions within the M shell (3d level) of the $Fe^{2+}$-ion, should be maintained at operating temperature also, it might attain an increased emission in the near infrared. Since the MgO is p-conductive at high temperatures, $Fe^{2+}$-ions may pass over into the trivalent form while absorbing holes in accordance with a reaction equation $$Fe^{2+} + \oplus \rightarrow Fe^{3+} - E$$

in which E is an energy of the order of 1 ev. and $\oplus$ indicates a positive hole. Consequently also, the absorption spectrum changes in which in the transition $Fe^{2+} \rightarrow Fe^{3+}$ particularly the disturbing band at $1\mu$ is decomposed and a new band is formed in the visible and ultraviolet respectively. Only this band formed at high temperature renders the iron to a suitable dope. The spectrum of the $Cr^{3+}$-ion incorporated in MgO shows two absorption bands, namely in the blue and part of the visible spectrum which, when increasing the temperature, shift to smaller photoenergies. Since in this case, analogous to the iron, it deals with transitions within the satisfactorily screened M shell (3d level), this shift is small so that the red band at high temperatures only touches the near infrared with its terminals. A valence change of the $Cr^{3+}$-ion does not take place. As far as the selective coloring in the visible range is concerned, chromium is substantially equivalent to iron. It has the additional advantage that the constant absorption in the near infrared is decreased owing to the said influence of high-valence additions.

Figure 3:
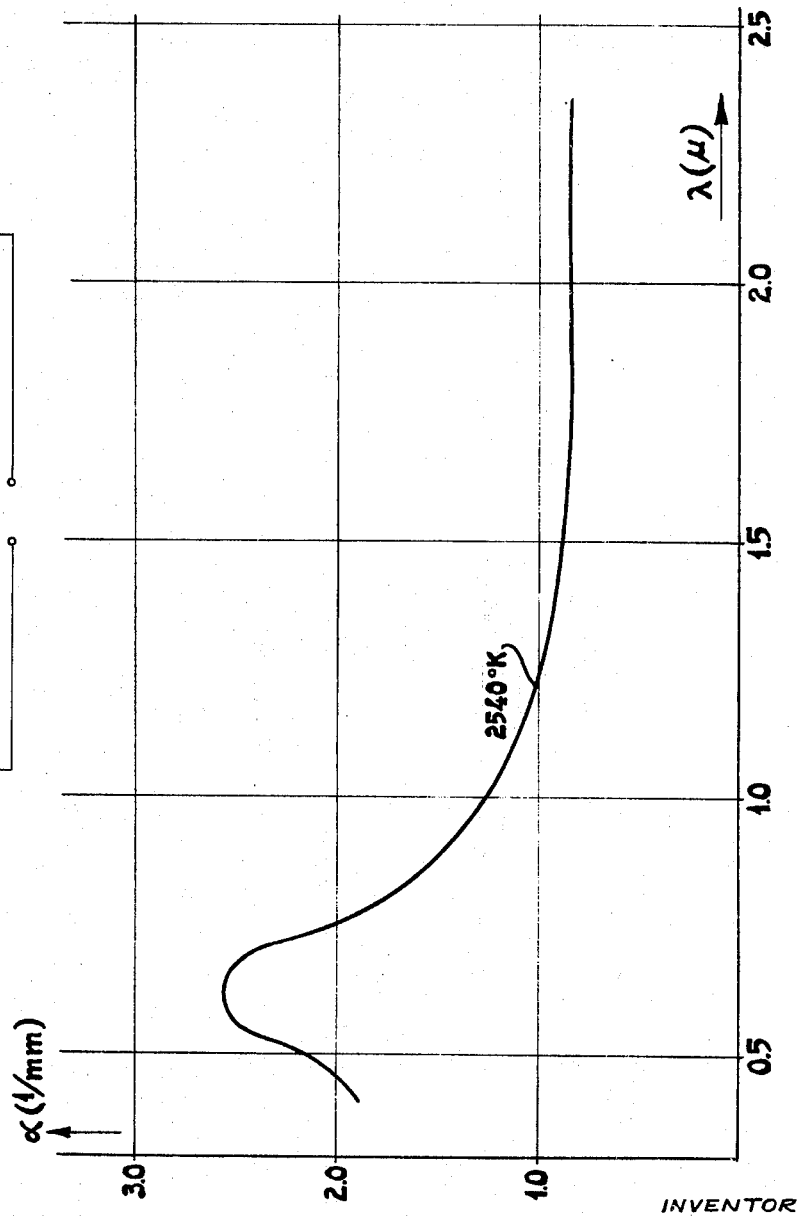
FIG. 3 is a graph showing the absorption coefficient of an Li-doped MgO crystal as a function of wave-length.

The incorporation of Li in Mg-positions also leads to a selective coloring in the visible range, the terminals of which already reach in the near infrared and consequently render this doping less promising than, for example, Fe and Cr (cf. FIG. 3).

What is claimed is:
1. A selective radiator having an incandescent member radiating principally in the visible spectrum and composed of a non-metallic crystalline material, and means to directly heat said member electrically, said member having a thickness $d$ in millimeters at least in one dimension:

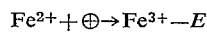

$$d \leq \frac{10^{-24} T^7}{\alpha_{min}}$$

where $\alpha_{min}$ is the minimum value, expressed in 1/mm., of the absorption coefficient of said member in the near infrared between the wave lengths 0.7 and 5 microns at an operating temperature T between approximately 2000 and 2800° K.

2. A selective radiator as claimed in claim 1, in which the basic material of the incandescent member is crystalline MgO.

3. A selective radiator as claimed in claim 1 in which the means for heating the member include contacts of a high-melting precious metal.

4. A selective radiator as claimed in claim 3, in which the heating means includes means to heat the contacts separately.

5. A selective radiator as claimed in claim 4 in which the portions of the contacts engaging the incandescent member are heated to a temperature approximately corresponding to the temperature of the incandescent member.

6. A selective radiator as claimed in claim 3 in which the contacts are in the form of thin sheets.

7. A selective radiator as claimed in claim 2, in which Mg-ions are substitutionally replaced by about 0.1 to 2 atomic percent of ions having a valence of at least +3.

8. A selective radiator as claimed in claim 2 in which the partial pressure of oxygen in the atmosphere surrounding the incandescent member exceeds $10^{-3}$ mm.

9. A selective radiator as claimed in claim 2, in which a metal selected from the group consisting of iron, chromium and lithium is incorporated in the basic material as coloring additions in a concentration between 0.01 and 3 atom percent.

10. A selective radiator as claimed in claim 1 in which $d$ has a value less than one-half of the member on right side of the equation.

11. A selective radiator as claimed in claim 2 in which the MgO is monocrystalline.

12. A selective radiator as claimed in claim 3 in which the contacts are composed of iridium.

13. A selective radiator as claimed in claim 7 in which oxygen ions are replaced by halogen ions.

References Cited by the Examiner
UNITED STATES PATENTS

| | | | |
|---|---|---|---|
| 906,550 | 12/08 | Nernst | 313—14 |
| 2,683,794 | 7/54 | Briggs et al. | 219—34 |
| 2,870,520 | 1/59 | Desvignes | 313—14 |
| 2,983,823 | 5/61 | Oberly | 219—34 |

GEORGE N. WESTBY, *Primary Examiner.*

RALPH G. NIELSON, *Examiner.*